United States Patent [19]
Chapman et al.

[11] 3,718,704
[45] Feb. 27, 1973

[54] METHYLATION PROCESS

[75] Inventors: Duane K. Chapman; John W. Newman, both of Ashland, Ky.; William S. Green, Columbus, Ohio

[73] Assignee: Ashland Oil Inc., Columbus, Ohio

[22] Filed: Jan. 8, 1971

[21] Appl. No.: 105,108

[52] U.S. Cl..........260/671 M, 260/671 C, 260/621 R

[51] Int. Cl..............................................C07c 3/52

[58] Field of Search...........260/671 M, 671 R, 621 R

[56] References Cited

UNITED STATES PATENTS

| | | | |
|---|---|---|---|
| 3,192,278 | 6/1965 | Hastings et al. | 260/671 M |
| 2,447,599 | 8/1948 | Schmerling | 260/671 M |

*Primary Examiner*—Curtis R. Davis
*Attorney*—Walter H. Schneider

[57] ABSTRACT

A process for methylating an organic compound which comprises contacting the organic compound with a carbon-oxide containing reactant gas in the presence of an oxide of a Group IB, IIB, and/or VIB metal containing catalyst, and at a temperature between about 400° F and about 1200° F.

23 Claims, No Drawings

METHYLATION PROCESS

BACKGROUND OF INVENTION

This invention relates to a process of methylating a methylatable organic compound.

More particularly, this invention is concerned with the methylation of organic compounds by contacting the compounds with a carbon-oxide containing gas in the presence of certain catalysts.

Various methods have been employed to methylate organic compounds. These methods, however, generally necessitate the use of expensive methylating agents such as methyl chloride, methyl alcohol, and dimethyl sulfates. Besides needing these costly methylating agents, the known processes also employ extremely difficult to handle liquid catalysts. Such catalysts include aluminum chloride complexes and sulfuric acid. The use of such liquid catalysts further adds to the undesirable economics of prior art processes in that large quantities of catalysts are lost during the commercial production of methylated compounds. Thus, a need remains for improvement in methods for methylating organic compounds. The principle object of this invention is to provide such improvements. The foregoing object according to this invention can be obtained by contacting a methylatable organic compound with a carbon-oxide containing reactant gas in the presence of a catalyst which is either a Group IB metal oxide, or a Group IIB metal oxide, or a Group VIB metal oxide or mixtures thereof, at a temperature between about 400° F and about 1,200° F.

The process of this invention now makes possible economically and commercially the production of various methylated organic compounds. This is accomplished by the ability to eliminate the expensive methylating agent as required in the prior art, and also by the comparative ease with which the solid catalyst of this invention can be handled compared with the liquid catalysts generally employed in the prior art.

BRIEF DESCRIPTION OF INVENTION

The process of this invention comprises feeding a methylatable organic compound into a confined zone; wherein said methylatable organic compound is contacted with a carbon-oxide containing reactant gas in the presence of a catalyst which is either a Group IB metal oxide, or a Group IIB metal oxide, or a Group VIB metal oxide, or a mixtures thereof, at a temperature between 400° F and about 1,200° F, at a weight hourly space velocity (WHSV, pounds of liquid feed/hour/pound of catalyst) of about 0.1 to about 10, and a pressure of zero to 15,000 psig., and from which a methylated organic compound is recovered.

It was quite surprising that the methylation process of this invention is so effective since no appreciable methylated products were obtained, when employing the reaction condition of the present invention except with metal-containing catalysts other than those which are within the scope of the invention, such as various supported metal catalysts or Group VIII metal oxides. Also, such catalysts tended to coke.

Furthermore, the process of this invention provides increased methylated products as compared to prior art methods.

Also, the laydown of carbon on the catalysts of this invention is considerably less than the laydown of carbon on various catalysts outside the scope of this invention, such as the above-mentioned support catalysts. Thus, the catalysts of this invention will be useful over a much longer period without the need to be regenerated and without having to shut down the process.

DESCRIPTION OF PREFERRED EMBODIMENTS

The methylatable organic compounds useful in the invention include all of those conveniently subjected to the methylation reactions of heretofore-know prior art. The most suitable methylatable organic compounds useful in the invention are the aromatic hydrocarbons and various substituted aromatic compounds. The term "aromatic" is used herein in its art-recognized scope which includes substituted and unsubstituted mono- and poly-nuclear ring compounds. Compounds of the benzene series as well as compounds of an aromatic character which are or contain a heterocyclic ring are examples of aromatic compounds.

The substituted aromatic compounds must, however, contain at least one hydrogen attached to the aromatic nucleus. The aromatic rings may be substituted with alkyl groups, aryl groups, alkaryl groups, hydroxy groups, amine groups, alkoxy groups, aryloxy groups, cycloalkyl groups, halide groups, and mixtures of these groups, and other radicals which do not prevent the desired reaction.

Of course, the aromatic hydrocarbons can be mono- or polynuclear and also can be mono- or polysubstituted.

Suitable aromatic hydrocarbons include benzene, naphthalene, anthracene, naphthacene, chrysene, pyrene, triphenylene, pentacene, picene, perylene, coronene, and phenanthrene.

Generally the alkyl groups which can be present as substituents on the aromatic compound contain from one to 22 carbon atoms and preferably from about one to eight carbon atoms, and most preferably from about one to four carbon atoms.

Suitable alkyl substituted aromatic compounds include toluene, xylene, isopropylbenzene, normal propylbenzene, alpha-methylnaphthalene, ethylbenzene, cumene, mesitylene, durene, p-cymene, butylbenzene, pseudocumene, o-diethylbenzene, m-diethylbenzene, p-diethylbenzene, isoamylbenzene, isohexylbenzene, pentaethylbenzene, pentamethylbenzene; 1, 2, 3, 4-tetraethyl-benzene; 1, 2, 3, 5-tetramethylbenzene; 1, 2, 4-triethylbenzene; 1, 2, 3-trimethylbenzene, m-butyltoluene; p-butyltoluene; 3, 5-diethyltoluene; o-ethyltoluene; p-ethyltoluene; m-propyltoluene; 4-ethyl-m-xylene; dimethylnaphthalenes, $\beta$-ethylnaphthalene; 2, 3-dimethylanthracene; 9-ethylanthracene; 2-methylanthracene; 0-methylanthracene; 9, 10-dimethylphenanthrene; and 3-methyl- phenanthrene. Higher molecular weight alkylaromatic hydrocarbons can also be used as starting materials and include aromatic hydrocarbons such as are produced by the alkylation of aromatic hydrocarbons with olefin polymers. Such products are frequently referred to in the art as alkylate, and include hexylbenzene, nonylbenzene, dodecylbenzene, pentadecylbenzene, hexyltoluene, nonyltoluene, dodecyltoluene, pentadecytoluene, etc. Very often alkylate is obtained as a high boiling fraction in which the alkyl group attached to the aromatic nucleus varies in size about $C_9$ to about $C_{18}$.

Generally, the hydroxy substituted aromatic compounds are the hydroxybenzenes, hydroxynaphthalenes, and bis-phenols. Useful hydroxy substituted aromatic compounds include phenol, o-cresol, m-cresol, p-cresol, catechol, resorcinol, hydroquinone, pyrogallol, alpha-naphthol, alpha-anthrol, and methylaniline and bisphenol-A.

Suitable aromatic compounds substituted with halide groups include chlorobenzene, o-dichlorobenzene, p-dichlorobenzene, bromobenzene, o-dibromobenzene, and p-dibromobenzene.

Suitable aromatic compounds substituted with aryl or alkaryl groups include diphenyl, triphenyl, diphenylmethane, triphenylmethane, dinaphthyl, and stilbene.

Suitable aromatic compounds substituted with amine groups include aniline, m-diaminobenzene, dimethylaniline, diphenylamine, methylaniline, diethylaminoaniline, and dimethylaminoaniline.

Suitable alkoxy or aryloxy group substituted compounds include anisole and phenetole.

Suitable cycloalkyl group substituted compounds include phenylcyclohexane.

Suitable compounds substituted with at least two different types of groups include o-, m-, and p-chlorophenol, 2,5-dichlorophenol, thymol, m-ethylphenol, p-t-butylphenol, o-phenylphenol, p-phenylphenol, o-, m-, and p-aminophenol, quaiacol, anol, eugenol, isoeugenol, and o-toluidine.

Other aromatic methylatable compounds suitable in the process of this invention include phenyl acetate, indene and flourene.

Some suitable aromatic compounds having heterocyclic ring wherein nitrogen is the heterocyclic atom include pyridine, alkyl substituted pyridines, furan, and quinoline. Thiophene is one of many suitable aromatic compounds wherein the heterocyclic atom is sulfur.

The most preferred methylatable organic compounds are phenol, toluene, ortho-xylene, pseudocumene and beta-methylnaphthalene.

The carbon-oxide containing reactant gas contains carbon monoxide and/or carbon dioxide. The carbon-oxide containing reactant gas preferably also contains hydrogen. The presence of the hydrogen in the gas increases the yield of methylated compounds probably due to the fact that the hydrogen tends to suppress unwanted side reactions, including the laydown of carbon on the catalyst. Where no hydrogen is introduced, some hydrogen nevertheless may be provided for by the spontaneous formation of such products as diphenyl at the temperature and pressure of the reaction zone. The preferred carbon-oxide is carbon monoxide. The gas may also contain other gases which are considered inert (gases which would not adversely affect the reaction and/or the product).

The ratio of hydrogen to carbon-oxide in the gas is from 0 to about 10 to 1. For some reactants in commercial scale facilities, large volumes of hydrogen may be helpful as a heat sink to help control reaction temperature and prevent formation of undesirable by-products from side reactions. The preferred ratio of hydrogen to carbon-oxide is between about 1 to 1 and about 6 to 1, with the most preferred ratio being about 2 to 1.

The methylation catalyst used in the process of this invention must be a nonsupported metal oxide catalyst which is either a Group IB metal oxide, or a Group IIB metal oxide, or a Group VIB metal oxide, or mixtures thereof. These catalysts must be virtually free of materials having cracking activity, and/or methanation (methane forming) activity at the operating conditions of the reaction of the invention.

The preferred Group IB metal oxide is cupric oxide. The preferred Group IIB metal oxide is zinc oxide and the preferred Group VIB metal oxide is chromium oxide. It is most preferred to employ mixtures of these metal oxides as catalysts. Some useful mixtures include copper oxide and chromia, copper oxide and zinc oxide, zinc oxide and chromia (zinc chromite), and mixtures of copper oxide, chromia, and zinc oxide.

A commercially available copper oxide/chromia catalyst is ICI catalyst -26-3 available from Imperial Chemical Industries Limited, which can be obtained in the form of pellets of 5.4 mm. diameter × 3.6 mm. high and a bulk density of 1.8 kg/l. It has a surface area of 20 m²/g, and contains from 42-54 percent by weight of cupric oxide and from 46-58 percent by weight of $Cr_2O_3$.

A commercially available zinc oxide/copper oxide catalyst in ICI catalyst 29-2 available from Imperial Chemical Industries Limited, which can be obtained in the form of pellets of 5.4 mm. diameter × 3.6 mm. high, a bulk density of 1.9 kg/l, and containing 33 percent copper oxide and 67 percent zinc oxide. It has a surface area of 50 m²/g.

A commercially available zinc chromite catalyst is Zn-0308T available from Harshaw, which contains 22% $Cr_2O_3$ and 78% ZnO. The surface area according to Harshaw is between 110 and 130 m²/gm.

The most preferred catalyst are those containing zinc and copper. In addition, the preferred methylatable organic compounds when using a copper oxide containing catalyst are the hydroxy substituted aromatic compounds, and in particular phenol.

The preferred mole ratio of carbon-oxide in the carbon-oxide containing gas to the methylatable organic compound is between 1 to 5 to about 20 to 1 and the most preferred mole ratio is between 1 to 1 and about 10 to 1. Normally, stoichiometric amounts of carbon-oxide in the carbon-oxide containing gas and the alkylatable organic compound will be employed. Ratios somewhat less than stoichiometric, such as 0.8 to 1, are useful where it is desired to maximize monomethylation with respect to consumption of reactants. On the other hand, experience has shown that the process operates quite satisfactorily with an excess of gas. The law of mass action indicates that an excess of a reactant in an equilibrium reaction will favor production of the products. However, any advantage gained in this fashion would have to be weighed against the increased capital investment required to handle a given throughput of feed along with the increased volume of carbon-oxide.

The reaction may be carried out at temperatures as low as about 400° F. Of course, the minimum permissible temperature for a particular methylatable compound will be somewhat higher than 400° F for the starting materials which are relatively difficult to methylate. For instance, no methylation was observed with pseudocumene under certain conditions and with a catalyst at an average temperature of about 600° F. The reaction may be carried out at temperatures as high as about 1,200° F. Of course the maximum permissible temperature for a particular methylatable compound may be somewhat lower than 1,200° F depending upon the temperature at which the starting material may decompose or the desired methylated compound may be dealkylated. Also, the maximum temperature employed will be influenced by various practical considerations such as the maximum temperature that the catalyst can withstand, the temperature resistance of the materials used in constructing the apparatus. Although temperatures ranging from about 400° F to about 1,200° F are suitable, it has been found that temperatures in the range of from about 825° F to 1,050° F and more specifically in the range of about 850° F and about 875° F provide yields which are unexpectedly greatly increased over temperatures outside such ranges. These increased yields at such temperatures were particularly unexpected since various known methylation processes indicate that the preferred temperatures are from 500°–800° F. The most preferred temperature range of between 850° F and 875° F was found to be so effective that under certain conditions almost 100 percent conversion to methylated products was obtained.

The reaction time of the methylatable organic compound and the carbon-oxide containing gas to traverse the void volume of the catalyst bed is generally from about 0.5 to about 120 seconds and preferably is from about 5 to about 50 seconds.

The methylatable organic compound feed is preferably passed over the catalyst at a weight hourly space velocity of from about 0.1 to about 10 and most preferably from about 0.5 to about 3.

Pressures of from about 0 to 15,000 psig may be employed with about 500 to 5,000 psig being preferred, and 1,000 psig being the most preferred.

The confined zone in which the process is conducted may be constructed of any desirable material, such as 18–8 chrome-nickel stainless steel. The confined zone may be part of a fixed or moving bed contactor, many types of which are familiar to those skilled in the hydrocarbon processing art.

The products may be collected and separated by any conventional technique, such as by distillation.

The methylated products recovered from the reaction preferably are monomethylated. For example, when the methylatable organic compound is either toluene, pseudocumene or beta-methylnaphthalene, the preferred alkylated compound is respectively either para-xylene, durene, or 2,6-dimethylnaphthalene.

In order that the invention may be better understood, the following non-limiting examples, wherein all parts and percents are by weight unless the contrary is stated, are given:

EXAMPLE 1

In a fixed-bed reactor containing an unsupported zinc chromite catalyst having a surface area of about 120 m²/gm and containing 22% $Cr_2O_3$ and 78% ZnO, pseudocumene is caused to flow through the fixed bed of catalyst at an average temperature of 850° F under a pressure of 1,000 psig., at a weight hourly space velocity of 0.65, and in the presence of a gas composed of one part by volume hydrogen and one part by volume carbon monoxide in a mole ratio of 1.86 moles of carbon monoxide per mole of pseudocumene. The average feed rate of the pseudocumene to the reactor is 92 cc/hr. An analysis of the liquid product by gas chromatographic analysis discloses that it contains 2 percent products boiling below pseudocumene, 86.7 percent pseudocumene, 1.1 percent of materials boiling between pseudocumene and durene, 10.2 percent of durene, and trace amounts of products boiling higher than durene.

EXAMPLE 2

In a fixed-bed reactor containing an unsupported zinc chromite catalyst having a surface area of about 120 m²/gm and containing 22% $Cr_2O_3$ and 78% ZnO, phenol is caused to flow through the fixed bed of catalyst at an average temperature of about 805° F under a pressure of 950 psig., at a weight hourly space velocity of 2, and in the presence of a gas composed of 2 parts of hydrogen and 1 part carbon monoxide in a mole ratio of 0.308 moles of carbon monoxide per mole of phenol. The average feed rate of the phenol to the reactor is 140 cc/hr. An analysis of the liquid product by gas chromatographic analysis discloses that it contains 3.7 percent benzene, 2.1 percent toluene, 0.6 percent xylene, 64.8 percent phenol, 25.8 percent cresols, and 3.0 percent materials boiling higher than cresols.

EXAMPLE 3

In a fixed-bed reactor containing an unsupported zinc chromite catalyst having a surface area of about 120 m²/gm and containing 22% $Cr_2O_3$ and 78% ZnO, phenol is caused to flow through the fixed bed of catalyst at an average temperature of about 858° F under a pressure of 920 psig., at a weight hourly space velocity of 0.5, and in the presence of a gas composed of two parts by volume hydrogen and one part by volume carbon monoxide in a mole ratio of 1.93 moles of carbon monoxide per mole of phenol. The average feed rate of the phenol to the reactor is 78 cc/hr. An analysis of the liquid product by gas chromatographic analysis discloses that it contains 7.2 percent benzene, 5.7 percent toluene, 2.1 percent xylene, 43.6 percent phenol, 19.0 percent cresols, and 22.4 percent materials boiling higher than cresols.

EXAMPLE 4

In a fixed-bed reactor containing an unsupported zinc chromite catalyst having a surface area of about 120 m²/gm and containing 22% $Cr_2O_3$ and 78% ZnO, a feed composed of one part phenol and one part methanol is caused to flow through the fixed bed of catalyst at an average temperature of about 833° F under a pressure of 1,000 psig., at a weight hourly space velocity of 1, and in the presence of a gas composed of two parts by volume hydrogen and one part by volume carbon monoxide in a mole ratio of 1.93 moles of carbon monoxide per mole of phenol. The average feed rate of the feed to the reactor is 80 cc/hr. An analysis of the liquid product by gas chromatographic analysis discloses that it contains 0.2 percent benzene, 0.5 percent toluene, and 99.3 percent phenol.

This example further demonstrates the unexpected results obtained by the process of this invention since the methanol, which is a known methylating agent, actually adversely affects the process of this invention.

EXAMPLE 5

In a fixed-bed reactor containing an unsupported zinc chromite catalyst having a surface area of about 120 m$^2$/gm and containing 22% $Cr_2O_3$ and 78% ZnO, phenol is caused to flow through the fixed bed of catalyst at an average temperature of 842° F under a pressure of 950 psig., at a weight hourly space velocity of 1.1, and in the presence of a gas composed of three parts by volume hydrogen and one part by volume carbon dioxide in a mole ratio of about 0.87 moles of carbon dioxide per mole of phenol. The average feed rate of the liquid phenol to the reactor is 39.4 cc/hr. An analysis of the liquid product by gas chromatographic analysis discloses that it contains 69.8 percent phenol, 20.2 percent ortho-cresol, 0.0 percent meta-cresol, 5.4 percent para-cresol, and 4.6 percent of xylenols and higher boiling materials.

EXAMPLE 6

In a fixed-bed reactor containing an unsupported zinc chromite catalyst having a surface area of about 120 m$^2$/gm and containing 22% $Cr_2O_3$ and 78% ZnO, phenol is caused to flow through the fixed bed of catalyst at an average temperature of 850° F under a pressure of 950 psig., at a weight hourly space velocity of 1.5, and in the presence of a gas composed of two parts by volume hydrogen and one part by volume carbon monoxide in a mole ratio of 0.73 moles of carbon monoxide per mole of phenol. The average feed rate of the liquid phenol to the reactor is 55 cc/hr. An analysis of the liquid product by gas chromatographic analysis discloses that it contains 67 percent phenol, 26.9 percent orthocresol, 0.0 percent meta-cresol, and 5.8 percent para-cresol.

EXAMPLE 7

In a fixed-bed reactor containing an unsupported zinc chromite catalyst having a surface area of about 120 m$^2$/gm and containing 22% $Cr_2O_3$ and 78% ZnO, phenol is caused to flow through the fixed bed of catalyst at an average temperature of 805° F under a pressure of 1,200 psig., at a weight hourly space velocity of 1.09, and in the presence of a gas composed of two parts by volume hydrogen and one part by volume carbon monoxide in a mole ratio of 1.1 moles of carbon monoxide per mole of phenol. The average feed rate of the liquid phenol to the reactor is 39 cc/hr. An analysis of the liquid product by gas chromatographic analysis discloses that it contains 64 percent phenol, 32.7 percent ortho-cresol, 0.0 percent meta-cresol, and 3.3 percent para-cresol.

EXAMPLE 8

In a fixed-bed reactor containing an unsupported zinc chromite catalyst having a surface area of about 120 m$^2$/gm and containing 22% $Cr_2O_3$ and 78% ZnO, phenol is caused to flow through the fixed bed of catalyst at an average temperature of 850° F under a pressure of 950 psig., at a weight hourly space velocity of 1.1, and in the presence of a gas composed of two parts by volume hydrogen and one part by volume carbon monoxide in a mole ratio of about 0.87 moles of carbon monoxide per mole of phenol. The average feed rate of the liquid phenol to the reactor is 39 cc/hr. An analysis of the liquid product by gas chromatographic analysis discloses that it contains 35.2 percent phenol, 39.5 percent ortho-cresol, trace amounts of meta-cresol, 7.4 percent paracresol, and 17.9 percent xylenols and higher boiling materials.

EXAMPLE 9

In a fixed-bed reactor containing an unsupported zinc chromite catalyst having a surface area of about 120 m$^2$/gm and containing 22% $Cr_2O_3$ and 78% ZnO, phenol is caused to flow through the fixed bed of catalyst at an average temperature of 875° F under a pressure of 950 psig., at a weight hourly space velocity of 4, and in the presence of a gas composed of two parts by volume hydrogen and one part by volume carbon monoxide in a mole ratio of about 0.3 moles of carbon monoxide per mole of phenol. The average feed rate of the liquid phenol to the reactor is 120 cc/hr. An analysis of the liquid product by gas chromatographic analysis discloses that it contains 69.3 percent phenol, 23.6 percent ortho-cresol, 0.1 percent meta-cresol, 3.8 percent para-cresol, and 3.2 percent xylenols and higher boiling materials.

EXAMPLE 10

In a fixed-bed reactor containing an unsupported zinc chromite catalyst having a surface area of about 120 m$^2$/gm and containing 22% $Cr_2O_3$ and 78% ZnO, phenol is caused to flow through the fixed bed of catalyst at an average temperature of 875° F under a pressure of 950 psig., at a weight hourly space velocity of 0.5, and in the presence of a gas composed of two parts by volume hydrogen and one part by volume carbon monoxide in a mole ratio of about 2.7 moles of carbon monoxide per mole of phenol. The average feed rate of the liquid phenol to the reactor is 20 cc/hr. An analysis of the liquid product by gas chromatographic analysis discloses that it contains only trace amounts of phenol, 3.6 percent of materials boiling between phenol and ortho-cresol, 1.9 percent ortho-cresol, 0.6 percent meta-cresol, 14.2 percent of materials boiling higher than para-cresol through 3,5 xylenol (the highest boiling xylenol isomer) and 79.7 percent of materials boiling higher than 3,5 xylenol.

EXAMPLE 11

In a fixed-ed reactor containing an unsupported zinc chromite catalyst having a surface area of about 120 m$^2$/gm and containing 22% $Cr_2O_3$ and 78% ZnO, phenol is caused to flow through the fixed bed of catalyst at an average temperature of 875° F under a pressure of 950 psig., at a weight hourly space velocity of 0.6, and in the presence of a gas composed of two parts by volume hydrogen and one part by volume carbon monoxide in a mole ratio of about 1 mole of carbon monoxide per mole of phenol. The average feed rate of the liquid phenol to the reactor is 20 cc/hr. An analysis of the liquid product by gas chromatographic analysis discloses that it contains 6.3 percent phenol, 38.8 percent ortho-cresol, 0.0 percent meta-cresol, and 10.4 percent para-cresol, 26.1 percent of materials boiling higher than para-cresol through 3,5 xylenol, 18.4 percent materials boiling higher than 3,5 xylenol.

EXAMPLE 12

In a fixed-bed reactor containing an unsupported zinc chromite catalyst having a surface area of about 120 m²/gm and containing 22% $Cr_2O_3$ and 78% ZnO, phenol is caused to flow through the fixed bed of catalyst at an average temperature of 1,046° F under a pressure of 950 psig., at a weight hourly space velocity of 3.4, and in the presence of a gas composed of two parts by volume hydrogen and one part by volume carbon monoxide in a mole ratio of about 3.1 moles of carbon monoxide per mole of phenol. The average feed rate of the liquid phenol to the reactor is 120 cc/hr. An analysis of the liquid product by gas chromatographic analysis discloses that it contains 37.8 percent phenol, 37.4 percent ortho-cresol, 0.4 percent meta-cresol, 3.7 percent para-cresol, and 20.7 percent xylenols and higher boiling materials.

EXAMPLE 13

In a fixed-bed reactor containing a catalyst of 11.8% $Cr_2O_3$ supported on a high purity, low sodium content gamma-type alumina, * (* This catalyst is commercially available from UOP, Inc. of Des Plaines, Illinois under their trade designation of Hydeal.) phenol is caused to flow through the fixed bed of catalyst at an average temperature of 925° F under a pressure of 950 psig., at a weight hourly space velocity of 1.08, and in the presence of a gas containing or composed of two parts by volume hydrogen and one part by volume carbon monoxide in a mole ratio of 1.11 moles of carbon monoxide per mole of phenol. The average feed rate of the liquid phenol to the reactor is 25 cc/hr. An analysis of the liquid product by gas chromatographic analysis discloses that it contains 99 percent phenol, 0.3 percent ortho-cresol, 0.2 percent meta-cresol, and 0.1 percent para-cresol.

EXAMPLE 14

In a fixed-bed reactor containing the same catalyst as in Example 13, phenol is caused to flow through the fixed bed of catalyst at an average temperature of 825° F under a pressure of 950 psig., at a weight hourly space velocity of 1.4, and in the presence of a gas composed of two parts by volume hydrogen and one part by volume carbon monoxide in a mole ratio of 0.87 moles of carbon monoxide per mole of phenol. The average feed rate of the liquid phenol to the reactor is 25 cc/hr. An analysis of the liquid product by gas chromatographic analysis discloses that it contains 94.2 percent phenol, 2.6 percent ortho-cresol, 1.4 percent meta-cresol, 1.1 percent para-cresol, and 0.7 percent xylenols and higher boiling materials.

EXAMPLE 15

In a fixed-bed reactor containing the same catalyst as in Example 13, phenol is caused to flow through the fixed bed of catalyst at an average temperature of 875° F under a pressure of 1,800 psig., at a weight hourly space velocity of 1.4, and in the presence of a gas composed of two parts by volume hydrogen and one part by volume carbon monoxide in a mole ratio of about 0.87 moles of carbon monoxide per mole of phenol. The average feed rate of the liquid phenol to the reactor is 25 cc/hr. An analysis of the liquid product by gas chromatographic analysis discloses that it contains 96.2 percent phenol, 1.6 percent ortho-cresol, 1.2 percent meta-cresol, 0.7 percent para-cresol, and 0.3 percent xylenols and higher boiling materials.

EXAMPLE 16

In a fixed-bed reactor containing a nickel oxide catalyst with an inert binder, available from the Girdler Catalysts Division of Chemetron Corp., Louisville, Kentucky, under the description G–78 and containing about 57 percent nickel, phenol is caused to flow through the fixed bed of catalyst at an average temperature of 875° F under a pressure of 950 psig, at a weight hourly space velocity of 0.5 and in the presence of a gas composed of two parts by volume of hydrogen and one part by volume carbon monoxide in a mole ratio of about 0.95 moles carbon monoxide per mole of phenol. The average feed rate of the liquid phenol to the reactor is 15 cc/hr. An analysis of the hydrocarbon liquid product by gas chromatographic analysis discloses that it contains 100 percent benzene. No methylation was observed and all the feed was degraded.

EXAMPLE 17

In a fixed-bed reactor containing a cobalt oxide catalyst with an inert binder, available from the Girdler Catalysts Division of Chemetron Corp., Louisville, Kentucky under the designation T–1687RS and containing about 54 percent cobalt, phenol is caused to flow through the fixed bed of catalyst at an average temperature of 875° F under a pressure of 950 psig., at a weight hourly space velocity of 0.8 and in the presence of a gas composed of two parts by volume of hydrogen and one part by volume of carbon monoxide in a mole ratio of about 1.05 moles carbon monoxide per mole of phenol. The average feed rate of the liquid phenol to the reactor is 19 cc/hr. An analysis of the hydrocarbon liquid product by gas chromatographic analysis discloses that it contains 100 percent benzene. No trace of cresols was found.

It is quite apparent from Examples 13–17 that at best only relatively poor yields of alkylated materials are obtained when catalysts other than the metal oxides of this invention are employed when operating within the specified reaction conditions of this invention.

EXAMPLE 18

In a fixed-bed reactor containing an unsupported copper oxide-zinc oxide catalyst* (* This catalyst is commercially available from Imperial Chemicals Industries, Limited under the trade designation ICI catalyst 29–2.) having a surface area of 50 m²/gm containing 60% CuO and 40% ZnO, phenol is caused to flow through the fixed bed of catalyst at an average temperature of 875° F under a pressure of 950 psig., at a weight hourly space velocity of 1.6 and in the presence of a gas composed of 2 parts by volume hydrogen and 1 part by volume carbon monoxide in a mole ratio of about 0.77 moles of carbon monoxide per mole of phenol. The average feed rate of the liquid phenol to the reactor is 60 cc/hr. An analysis of the liquid product by gas chromatographic analysis discloses that it contains 46.6 percent phenol, 47.7 percent orthocresol, 0.2 percent para-cresol, and 5.5 percent xylenols and higher boiling materials.

EXAMPLE 19

In a fixed-bed reactor containing the same catalyst as in Example 18, phenol is caused to flow through the fixed bed of catalyst at an average temperature of 950° F under a pressure of 950 psig., at a weight hourly space velocity of 1.1 and in the presence of a gas composed of 2 parts by volume hydrogen and 1 part by volume carbon monoxide in a mole ratio of about 1.17 moles of carbon monoxide per mole of phenol. The average feed rate of the liquid phenol to the reactor is 42 cc/hr. An analysis of the liquid product by gas chromatographic analysis discloses that it contains 37.5 percent phenols, 37.3 percent ortho-cresol, trace amounts of meta-phenol, 1.9 percent para-cresol, and 23.4 percent of xylenols and higher boiling materials.

EXAMPLE 20

In a fixed-bed reactor containing the same catalyst as in Example 18, phenol is caused to flow through the fixed bed of catalyst at an average temperature of 825° F under a pressure of 950 psig., at a weight hourly space velocity of 1.1 and in the presence of a gas composed of 2 parts by volume hydrogen and 1 part by volume carbon monoxide in a mole ratio of about 1.17 moles of carbon monoxide per mole of phenol. The average feed rate of the liquid phenol to the reactor is 42 cc/hr. An analysis of the liquid product by gas chromatographic analysis discloses that it contains 72.1 percent phenol, 26.3 percent ortho-cresol, 0.0 percent meta-cresol, trace amounts of para-cresol, and 1.6 percent xylenols and higher boiling materials.

EXAMPLE 21

In a fixed-bed reactor containing the same catalyst as in Example 18, phenol is caused to flow through the fixed bed of catalyst at an average temperature of 876° F under a pressure of 950 psig., at a weight hourly space velocity of 1.1 and in the presence of gas composed of two parts by volume hydrogen and one part by volume carbon monoxide in a mole ratio of about 1.17 moles of carbon monoxide per mole of phenol. The average feed rate of the liquid phenol to the reactor is 42 cc/hr. An analysis of the liquid product by gas chromatographic analysis discloses that it contains 41.9 percent phenol, 45.1 percent ortho-cresol, trace amounts of meta-cresol, 0.4 percent para-cresol and 12.7 percent of xylenols and higher boiling materials.

EXAMPLE 22

In a fixed-bed reactor containing the same catalyst as in Example 18, phenol is caused to flow through the fixed bed of catalyst at an average temperature of 850° F under a pressure of 950 psig., at a weight hourly space velocity of 0.5 and in the presence of a gas composed of two parts by volume hydrogen and one part by volume carbon monoxide in a mole ratio of about 0.1 moles of carbon monoxide per mole of phenol. The average feed rate of the liquid phenol to the reactor is 20 cc/hr. An analysis of the liquid product by gas chromatographic analysis discloses that it contains 46.5 percent phenol, 46.1 percent ortho-cresol, trace amounts of meta-cresol, and 0.7 percent para-cresol, and 6.7 percent of xylenols and higher boiling materials.

EXAMPLE 23

In a fixed-bed reactor containing the same catalyst as in Example 18, phenol is caused to flow through the fixed bed of catalyst at an average temperature of 775° F under a pressure of 950 psig., at a weight hourly space velocity of 0.5 and in the presence of a gas composed of two parts hydrogen and one part carbon monoxide in a mole ratio of 2.6 moles of carbon monoxide per mole of phenol. The average feed rate of the liquid phenol to the reactor is 22 cc/hr. An analysis of the liquid product by gas chromatographic analysis discloses that it contains 54.99 percent phenol, 41.87 percent ortho-cresol, trace amounts of meta-cresol, trace amounts of para-cresol, and 3.14 xylenols and higher boiling materials.

EXAMPLE 24

In a fixed-bed reactor containing the same catalyst as in Example 18, phenol is caused to flow through the fixed bed of catalyst at an average temperature of 1,100° F under a pressure of 950 psig., at a weight hourly space velocity of 0.5 and in the presence of a gas composed of two parts hydrogen and one part carbon monoxide in a mole ratio of 2.7 moles of carbon monoxide per mole of phenol. The average feed rate of the liquid phenol to the reactor is 20 cc/hr. An analysis of the liquid product by gas chromatographic analysis discloses that it contains 69.97 percent phenol, 19.41 percent ortho-cresol, 2.36 percent meta-cresol, 8.27 percent para-cresol and trace amounts of xylenols and higher boiling materials.

EXAMPLE 25

In a fixed-bed reactor containing the same catalyst as in Example 18, phenol is caused to flow through the fixed bed of catalyst at an average temperature of 875° F under a pressure of 1,700 psig., at a weight hourly space velocity of 1.05 and in the presence of a gas composed of two parts by volume hydrogen and one part by volume carbon monoxide in a mole ratio of 1.08 moles of carbon monoxide per mole of phenol. The average feed rate of the liquid phenol to the reactor is 40 cc/hr. An analysis of the liquid product by gas chromatographic analysis discloses that it contains 53.2 percent phenol, 40.2 percent ortho-cresol, trace amounts of meta-cresol, 0.8 percent para-cresol, and 5.8 percent xylenols and higher boiling materials.

EXAMPLE 26

In a fixed-bed reactor containing the same catalyst as in Example 18, phenol is caused to flow through the fixed bed of catalyst at an average temperature of 825° F under a pressure of 750 psig., at a weight hourly space velocity of 0.5 and in the presence of a gas composed of two parts by volume hydrogen and one part by volume carbon monoxide in a mole ratio of about 2.13 moles of carbon monoxide per mole of phenol. The average feed rate of the liquid phenol to the reactor is 20 cc/hr. An analysis of the liquid product by gas chromatographic analysis discloses that it contains 20.5 percent phenol, 60.3 percent ortho-cresol, trace amounts of meta-cresol, 0.1 percent para-cresol, and 19.1 percent of xylenols and higher boiling materials.

EXAMPLE 27

In a fixed-bed reactor containing the same catalyst as in Example 18, phenol is caused to flow through the fixed bed of catalyst at an average temperature of 825° F under a pressure of 1,800 psig., at a weight hourly space velocity of 0.5 and in the presence of a gas composed of two parts by volume hydrogen and one part by volume carbon monoxide in a mole ratio of about 2.13 moles of carbon monoxide per mole of phenol. The average feed rate of the liquid phenol to the reactor is 20 cc/hr. An analysis of the liquid product by gas chromatographic analysis discloses that it contains 3.2 percent phenol, 3.1 percent of materials boiling between phenol and cresols, 25.8 percent ortho-cresol, 1.3 percent of materials boiling higher than para-cresol through 3,5 xylenol, and 66.6 percent of materials boiling higher than 3,5 xylenol.

EXAMPLE 28

In a fixed-bed reactor containing the same catalyst as in Example 18, phenol is caused to flow through the fixed bed of catalyst at an average temperature of 875° F under a pressure of 950 psig., at a weight hourly space velocity of 0.53 and in the presence of a gas composed of two parts by volume hydrogen and one part by volume carbon monoxide in a mole ratio of 2.16 moles of carbon monoxide per mole of phenol. The average feed rate of the liquid phenol to the reactor is 20 cc/hr. An analysis of the liquid product by gas chromatographic analysis discloses that it contains 6.0 percent phenol, 46.7 percent ortho-cresol, trace amounts of meta-cresol, 0.3 percent para-cresol, 47.0 percent of xylenols and higher boiling materials.

EXAMPLE 29

In a fixed-bed reactor containing the same catalyst as in Example 18, phenol is caused to flow through the fixed bed of catalyst at an average temperature of 825° F under a pressure of 950 psig., at a weight hourly space velocity of 0.5 and in the presence of a gas composed of two parts by volume hydrogen and one part by volume carbon monoxide in a mole ratio of about 2.13 moles of carbon monoxide per mole of phenol. The average feed rate of the liquid phenol to the reactor is 20 cc/hr. An analysis of the liquid product by gas chromtographic analysis discloses that it contains 38.7 percent phenol, 53.7 percent ortho-cresol, trace amounts of para-cresol, and 7.6 percent of xylenols and higher boiling materials.

EXAMPLE 30

In a fixed-bed reactor containing an unsupported copper oxide chromia catalyst* (*This catalyst is commercially available from Imperial Chemical Industries, Limited under the trade designation ICI Catalyst 26-3.) having a surface area of 20 m²/gm and containing 46–54% CuO and 46–58% $Cr_2O_3$, phenol is caused to flow through the fixed bed of catalyst at an average temperature of 875° F under a pressure of 950 psig., at a weight hourly space velocity of 1.0 and in the presence of a gas composed of two parts by volume of hydrogen and one part by volume carbon monoxide in a mole ratio of about 1.2 moles of carbon monoxide per mole of phenol. The average feed rate of the liquid phenol to the reactor is 43 cc/hr. An analysis of the liquid product by gas chromatographic analysis discloses that it contains 77.7 percent phenol, 21.3 percent ortho-cresol, trace amounts of meta-cresol and 1.0 percent para-cresol.

EXAMPLE 31

In a fixed bed reactor containing the same catalyst as in Example 30, phenol is caused to flow through the fixed bed of catalyst at an average temperature of 875° F under a pressure of 1,800 psig., at a weight hourly space velocity of 1.0 and in the presence of a gas composed of two parts by volume hydrogen and one part by volume carbon monoxide in a mole ratio of about 1.2 moles of carbon monoxide per mole of phenol. The average feed rate of the liquid phenol to the reactor is 43 cc/hr. An analysis of the liquid product by gas chromatographic analysis discloses that it contains 59.6 percent phenol, 33.7 percent ortho-cresol, trace amounts of meta-cresol, 1.9 percent para-cresol, and 4.8 percent xylenols and higher boiling materials.

EXAMPLE 32

In a fixed-bed reactor containing the same catalyst as in Example 30, phenol is caused to flow through the fixed bed of catalyst at an average temperature of 925° F under a pressure of 950 psig., at a weight hourly space velocity of 1.08 and in the presence of a gas composed of two parts by volume of hydrogen and one part by volume carbon monoxide in a mole ratio of about 1.1 moles of carbon monoxide per mole of phenol. The average feed rate of the liquid phenol to the reactor is 43 cc/hr. An analysis of the liquid product by gas chromatographic analysis discloses that it contains 60.3 percent phenol, 34.6 percent ortho-cresol, 0.0 percent meta-cresol, 1.8 percent para-cresol, 1.0 percent of materials higher boiling than para-cresol through 3,5 xylenol and 2.3 percent materials boiling higher than 3,5 xylenol.

EXAMPLE 33

In a fixed-bed reactor containing an unsupported zinc oxide-copper oxide catalyst having a surface area of 50 m²/gm and containing 60% CuO and 40% ZnO, o-xylene is caused to flow through the fixed bed of catalyst at an average temperature of about 875° F under a pressure of 950 psig., at a weight hourly space velocity of 0.4 and in the presence of a gas composed of 2 parts hydrogen and one part carbon monoxide in a mole ratio of about 2.9 moles of carbon monoxide per mole of o-xylene. The average feed rate of the o-xylene to the reactor is about 18 cc/hr. An analysis of the liquid product by gas chromatographic analysis discloses that it contains 96.6 percent o-xylene and 3.4 percent materials boiling higher than o-xylene.

EXAMPLE 34

In a fixed-bed reactor containing an unsupported zinc-oxide-copper oxide catalyst having a surface area of 50 m²/gm and containing 60% CuO and 40% ZnO, toluene is caused to flow through the fixed bed to catalyst at an average temperature of about 875° F under a pressure of 950 psig., at a weight hourly space velocity of 0.4, and in the presence of a gas composed of two parts by volume hydrogen and one part by volume carbon monoxide in a mole ratio of 2.5 moles of carbon monoxide per mole of toluene. The average feed rate of the toluene to the reactor is about 18 cc/hr. An analysis of the liquid product by gas chromatographic analysis discloses that it contains 89.8 percent toluene and 10.2 percent materials boiling higher than toluene.

EXAMPLE 35

In a fixed-bed reactor containing an unsupported zinc chromite catalyst having a surface area of about 120 m²/gm and containing 22% $Cr_2O_3$ and 78% ZnO, quinoline is caused to flow through the fixed bed of catalyst at an average temperature of about 850° F under a pressure of 950 psig., at a weight hourly space velocity of 1.1 and in the presence of a gas composed of two parts by volume hydrogen and one part by volume carbon monoxide in a mole ratio of about 1.1 moles of carbon monoxide per mole of quinoline. The average feed rate of the feed to the reactor is 35 cc/hr. An analysis of the liquid product by gas chromatographic analysis discloses that it contains 12.5 percent materials boiling below quinoline, 23.6 percent quinoline, 34.4 percent of materials boiling between quinoline and 4-methylquinoline, 17.7 percent 4-methylquinoline and 11.8 percent of materials boiling above 4-methylquinoline.

Also the amount of carbon laydown on the catalysts was determined and the following results obtained:

| Catalyst | Weight % Carbon |
| --- | --- |
| ICI catalyst 26-3 (unsupported) | 3.5 |
| Harshaw Zn0308T (unsupported) | 12.4 |
| UOP-Hydcal (supported) | 30.4 |

This clearly illustrates that the catalysts of this invention have a larger active life as compared to supported metal containing catalysts.

What is claimed is:

1. A process for methylating a methylatable aromatic hydrocarbon compound which comprises feeding the aromatic hydrocarbon compound into a confined zone; in said zone contacting said aromatic hydrocarbon compound with a carbon oxide-containing reactant gas in the presence of a nonsupported catalyst selected from the group consisting of Group IB metal oxide, Group IIB metal oxide, Group VIB metal oxide, and mixtures thereof, at a temperature between about 400°F. and about 1,200°F., at a weight hourly space velocity of 0.1–10 and a pressure of 0–15,000 psig., and recovering a methylated aromatic hydrocarbon compound from said confined zone.

2. The process of claim 1 wherein said temperature is between about 825° F and about 1,200° F.

3. The process of claim 1 wherein said temperature is between about 850° F and about 875° F.

4. The process of claim 1 wherein said carbon-oxide containing reactant gas also includes hydrogen.

5. The process of claim 4 wherein the ratio of the hydrogen to the carbon-oxide in said carbon-oxide containing reactant gas is between about 10:1 to about 1:1.

6. The process of claim 1 wherein said carbon-oxide containing reactant gas contains carbon monoxide.

7. The process of claim 1 wherein said methylatable aromatic hydrocarbon compound is mononuclear.

8. The process of claim 1 wherein said methylatable aromatic hydrocarbon compound is toluene.

9. The process of claim 1 wherein said methylatable aromatic hydrocarbon compound is ortho xylene.

10. The process of claim 1 wherein said methylatable aromatic hydrocarbon compound is pseudocumene.

11. The process of claim 1 wherein the ratio of the carbon-oxide in the carbon-oxide containing gas to the methylatable aromatic compound is between about 1:5 and about 20:1.

12. The process of claim 1 wherein said catalyst contains a Group IB metal oxide.

13. The process of claim 12 wherein said Group IB metal oxide is copper oxide.

14. The process of claim 1 wherein said catalyst contains a Group IIB metal oxide.

15. The process of claim 14 wherein said Group IIB metal oxide is zinc oxide.

16. The process of claim 1 wherein said catalyst contains a Group VIB metal oxide.

17. The process of claim 16 wherein said Group VIB metal oxide is $Cr_2O_3$.

18. The process of claim 1 wherein said catalyst is zinc chromite.

19. The process of claim 1 wherein said catalyst is a zinc oxide-copper oxide catalyst.

20. The process of claim 1 wherein said catalyst is a copper oxide-chromia catalyst.

21. A process for methylating a methylatable hydroxy substituted aromatic compound which comprises feeding hydroxy substituted aromatic compound into a confined zone; in said zone contacting said hydroxy substituted aromatic compound with a carbon oxide-containing reactant gas in the presence of a nonsupported catalyst selected from the group consisting of Group IB metal oxide, Group IIB metal oxide, Group VIB metal oxide, and mixtures thereof, at a temperature between about 400°F. and about 1,200°F., at a weight hourly space velocity of 0.1–10 and a pressure of 0–15,000 psig., and recovering methylated hydroxy substituted aromatic compound from said confined zone.

22. A process for methylating phenol which comprises feeding phenol into a confined zone; in said zone contacting said phenol with a carbon oxide-containing reactant gas in the presence of a nonsupported catalyst selected from the group consisting of Group IB metal oxide, Group IIB metal oxide, Group VIB metal oxide, and mixtures thereof, at a temperature between about 400°F. and about 1,200°F., at a weight hourly space velocity of 0.1–10 and a pressure of 0–15,000 psig., and recovering methylated phenol from said confined zone.

23. A process for methylating quinoline which comprises feeding quinoline into a confined zone; in said zone contacting said quinoline with a carbon oxide-containing reactant gas in the presence of a nonsupported catalyst selected from the group consisting of Group IB metal oxide, Group IIB metal oxide, Group VIB metal oxide, and mixtures thereof, at a temperature between about 400°F. and about 1,200°F., at a weight hourly space velocity of 0.1–10 and a pressure of 0–15,000 psig., and recovering methylated quinoline from said confined zone.

* * * * *